United States Patent [19]

Millay et al.

[11] Patent Number: 4,715,147

[45] Date of Patent: Dec. 29, 1987

[54] IN-PROCESS GAGING EQUIPMENT FOR FLEXIBLE GRINDING CELLS

[75] Inventors: Lawrence I. Millay, Springfield, Vt.; Edward Bourgoine, Claremont, N.H.

[73] Assignee: Ex-Cell-O Corporation, Walled Lake, Mich.

[21] Appl. No.: 914,034

[22] Filed: Oct. 1, 1986

[51] Int. Cl.[4] ............................................. B24B 49/04
[52] U.S. Cl. ................................ 51/165.71; 51/165 R; 51/281 R; 51/277; 29/568; 364/474
[58] Field of Search ............ 51/165.71, 165.77, 165 R, 51/215 R, 277, 281 R; 29/568; 33/1 M; 364/474

[56] References Cited

U.S. PATENT DOCUMENTS

| | | | |
|---|---|---|---|
| 4,068,412 | 1/1978 | Camp | 51/277 |
| 4,205,492 | 6/1980 | Matsuura | 51/165.77 |
| 4,274,230 | 6/1981 | Thalheim | 51/165 R |
| 4,343,114 | 8/1982 | Tourasse | 51/165.71 |
| 4,547,955 | 10/1985 | Shiomi | 29/568 |
| 4,567,659 | 2/1986 | Kitamura | 33/1 M |
| 4,596,066 | 1/1986 | Inoue | 29/568 |
| 4,603,511 | 8/1986 | Komatsu | 51/165.71 |

Primary Examiner—Harold D. Whitehead
Attorney, Agent, or Firm—John C. Evans

[57] ABSTRACT

A flexible grinding cell in-process gage system includes a pallet assembly and gage bench fixture assembly with means to preset the gage for subsequent use at a grinding station. The preset pallet and gage are operated at the grinding station to produce a signal to compensate for any pallet mis-alignment at the grinding station prior to an automatic machining sequence.

5 Claims, 10 Drawing Figures

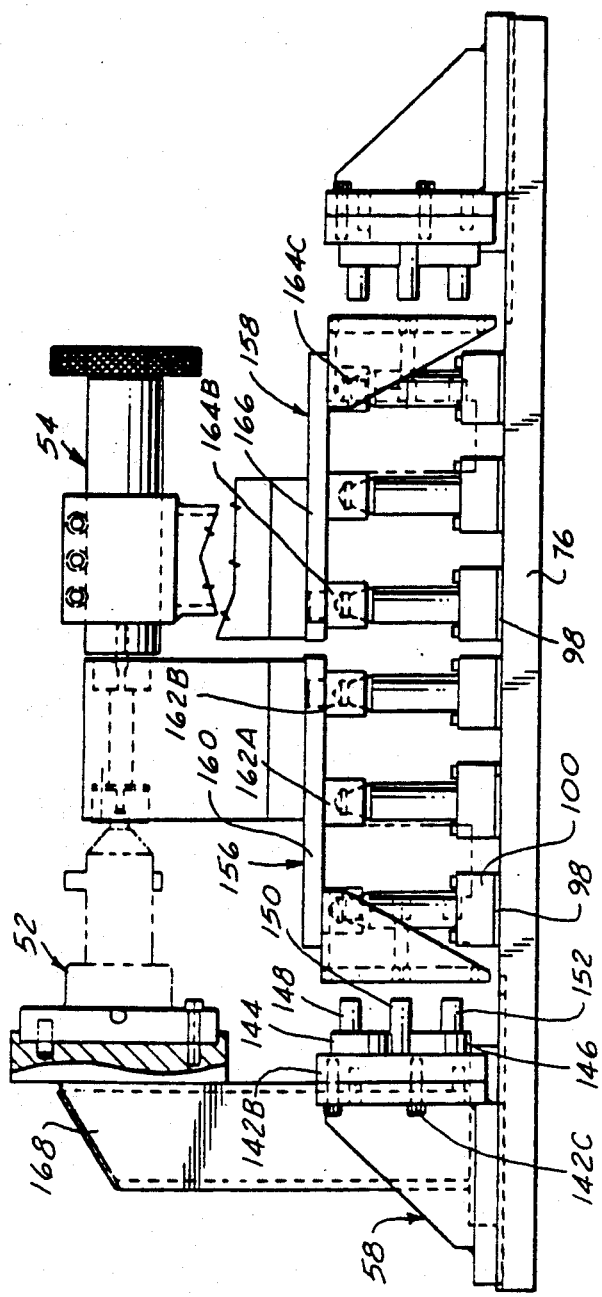

IN-PROCESS GAGING EQUIPMENT FOR FLEXIBLE GRINDING CELLS

BACKGROUND OF THE INVENTION

The present invention relates to computer numerically controlled grinding machines and more particularly to automatic processing of gaging equipment for use in flexible grinding cells.

DESCRIPTION OF THE PRIOR ART

Unmanned flexible grinding cells have used a computer to control the position of various elements of the grinding machine. Furthermore such computers are programmable to control and direct a robot to remove and install workpiece holding devices on the machine and furthermore operable to direct a wheel changer to remove and install grinding wheels in accordance with the requirements for a flexible machining sequence to be performed by the cell.

Furthermore, as shown in U.S. Pat. No. 4,205,492, it is known to digitally control a grinding machine by use of a in-process gaging device for measuring the outer diameter of a workpiece during the processing thereof and to produce an output signal to a size signalling circuit used in conjunction with the programmable controller for the machine. U.S. Pat. No. 4,567,659 discloses use of an on-board gaging station to measure the length and O.D. of a tool with the data being inputted into the machine control. U.S. Pat. No. 4,596,066 includes an automatic workpiece handling unit and a tool reforming station to insure that tool s will be accurately formed prior to positioning in the coordinate system of an NC machine. U.S. Pat. No. 4,547,955 shows use of a transfer truck to automatically transfer tools during a machining operation.

While such flexible manufacturing and in-process gaging systems are suitable for their intended purpose, in order to complete the full utilization of the flexible grinding machine it is desirable to extend the concept of flexibility by providing in-process gaging equipment as needed for a programmed sequence of jobs to be performed by the cell. Furthermore, it is desirable to provide such in-process gaging equipment on a flexible basis by providing equipment and by use of a method that enables the in-process gaging equipment to be applied to a particular job on a flexible grinding cell apparatus without the need for manually presetting the gaging equipment for a particular job application in the flexible grinding cell.

SUMMARY OF THE INVENTION

Accordingly it is a primary object of the present invention to provide an improved flexible grinding cell having an associated system for precalibrating and supplying in-process gaging equipment for use in the cell on a continuous flexible basis and to practice a method for using a flexible supply of gaging equipment in a flexible grinding cell.

Yet another object of the present invention is to provide an improved grinding machine and presetting in-process gage system and method wherein bench fixture means are provided to preset in-process gaging equipment in accordance with a desired machining operation in the flexible cell and wherein means are provided to store and flexibly provide preselected ones of the preset in-process gaging equipment to the flexible grinding cell in accordance with the preprogrammed selection of jobs to be run on the cell; a further object of the present invention is to provide apparatus and to practice a method as set forth in either of the proceeding objects wherein the in-process gaging equipment required for a particular job includes a pallet and gage head which is adapted to be placed and preset on a bench fixture for precalibration of the gaging equipment and wherein thereafter is placed on a tooling rack for positioning by automated supply means to a grinding area of the cell.

Yet another object of the present invention is to provide apparatus of the preceding type wherein coacting precision studs and guide sockets are provided between the pallet and a reference surface either on the bench fixture or on the grinding cell which allow the pallet to be positioned precisely time after time so as to provide accurate replica presetting of the gaging equipment on the bench fixture and accurate positioning of the gage on the flexible grinding cell to produce an automated flexible gaging of workpiece elements on the grinding cell in the operation of the flexible machining sequence to be carried out by the flexible grinding cell.

Still another object of the present invention is to provide improved apparatus for presetting and supplying in-process gaging equipment to a grinding cell including a bench setup fixture having a head stock center and driver center thereon; precision studs mounted on the fixture providing a reference for a gaging pallet and an in-process gage secured to the pallet; and to further provide slide coupling means on the bench setup fixture to operate the gaging equipment to cause sensing components thereof to be positioned and operated with respect to a master part or workpiece component set between the centers of the work driver and tail stock components; and a method which includes setting the gage sensing elements of the gage to produce a proper presetup of the gage sensing elements and thereafter retracting the preset sensing elements against a reference stop and disconnecting all of the coupling of hydraulic lines and electrical lines from the gage.

A further object is to provide the apparatus of the preceding object with means to transfer the preset gage pallet assembly into a rack holding position for later transfer to the machine; and to provide a computer controlled robot operable to put the preset gage and pallet assembly into the flexible grinding cell and to further place a master workpiece in the grinding cell at which time a signal is provided to a computer to lock the master workpiece in place and to couple the hydraulic and electrical supplies to the position gage so as to actuate the gage through the computer to measure the master workpiece. And providing gage means to measure and to produce an electrical offset signal for the computer which corrects for any errors introduced by the installation of the pallet in the grinding machine. The robot then removes the master workpiece and the machine is conditioned for automatic grinding of new workpiece types with in-process gaging provided by the preset flexibly provided in-process gage and pallet assembly.

BRIEF DESCRIPTION OF THE DRAWINGS

Various other objects, features and advantages of the present invention will be more apparent from the following detailed description of a preferred embodiment when considered in connection with the accompanying drawings wherein like reference numerals designate like or corresponding parts throughout the several view, and in which:

FIG. 6 is a front elevational view of the assembly shown in FIG. 5;

DETAILED DESCRIPTION OF PREFERRED EMBODIMENTS

Figure 1:
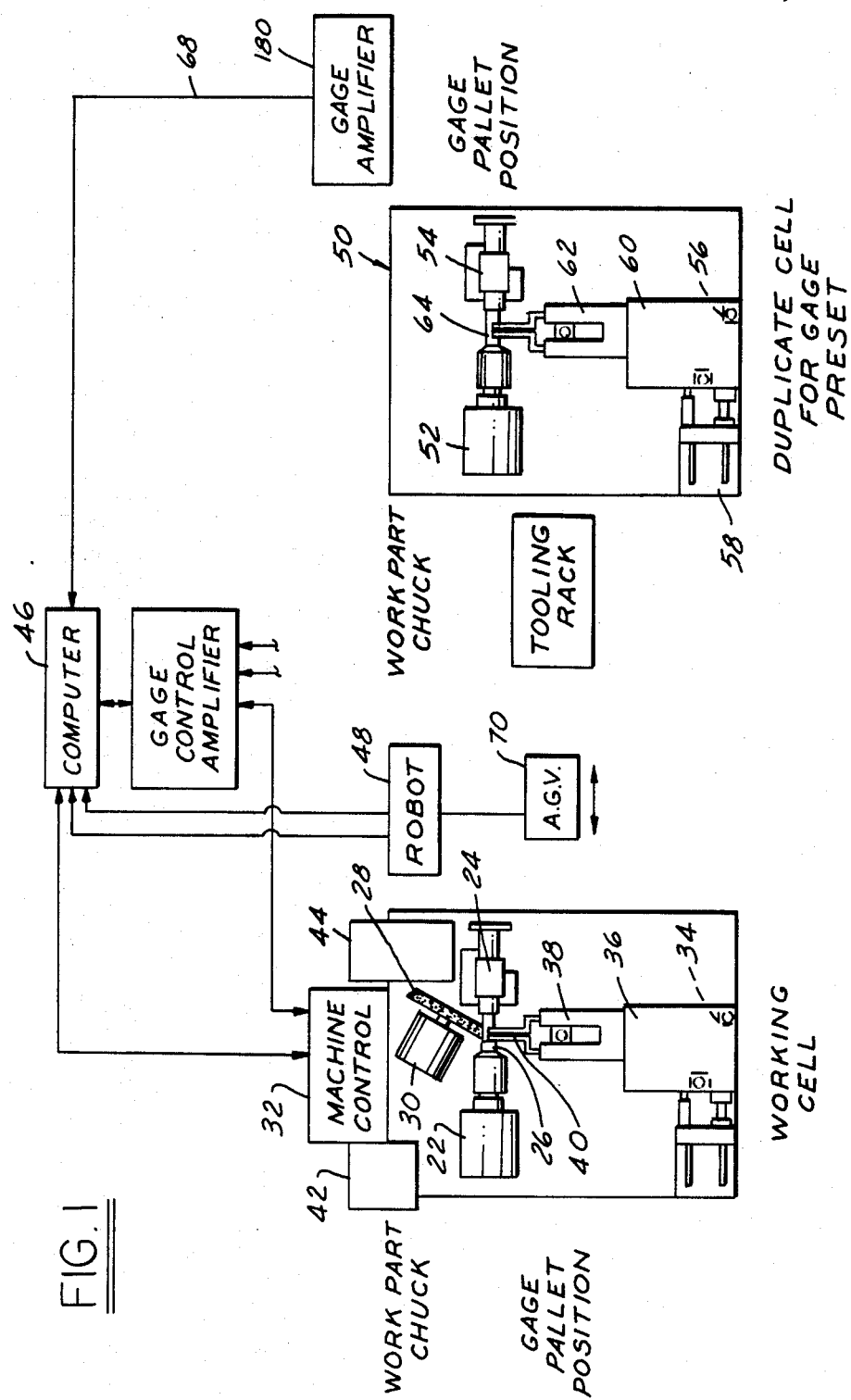
FIG. 1 is a diagrammatic view of a flexible gaging system including the apparatus and a process for practicing the method of the present invention.

Referring now to FIG. 1, a flexible grinding cell 20 is illustrated including a workpart chuck 22 and a tail stock 24. They a workpiece 26 with respect to a grinding wheel 28 driven by a motor 30 under the control of a machine controller 32. The flexible grinding cell 20 includes a gage pallet positioner 34 for supporting a gage pallet 36 having a in-process gage 38 supported thereon with sensing fingers 40 selectively engageable with the workpiece to detect the dimensional changes thereon produced by the grinding wheel 28. Also associated with the flexible grinding cell 20 is a work holder 42 and a grinding wheel changer 44 of the type more specifically set-forth in copending U.S. Ser. No. 646,992 filed Sept. 4, 1984 by a common assignee and now Pat. No. 4,654,953.

The flexible grinding cell 20 thereby constitutes an unmanned flexible manufacturing grinding cell. It includes a host computer 46 which is a CNC type device that will provide signals to the various machine elements and to a robot 48 which removes and installs workpiece holding devices from the work holder 42. Furthermore the computer 46 will operate to direct the wheel changer 44 to remove and install grinding wheels on the drive system in accordance with the sequence of flexible manufacturing jobs to be performed by the cell 20.

In accordance with the present invention, the in-process gaging equipment 38 is preset on a bench fixture assembly 50 hereinafter referred to as BFA. The BFA thus includes a work drive center 52 that physically corresponds to the workpart chuck 22 of the grinding cell. It is associated with an adjustably positioned tail stock 54. The BFA further includes a gage pallet positioner 56 corresponding to the gage pallet positioner 34 on the flexible grinding cell 20. The gage pallet positioner is associated with a coupling locater 58 which is connected and disconnected to a gage pallet 60 supported on the gage pallet positioned 56 so as to locate a in-process gage 62 for presetting on a master workpiece 64 supported on the work drive 52.

The BFA includes a gage output amplifier 180. The master workpiece is uses initially on the BFA and is later transferred by robot 48 to the grinding area of the flexible grinding cell 20 along with the necessary tooling to perform a preset grinding operation as preprogrammed by the computer 46. The computer 46 is linked to the control of the robot 48 and, if desired, to a automatic guided vehicle or AGV 70 which is selectively positioned to transport preset gage and pallet assemblies stored at a tooling rack 72. The tooling rack 72 constitutes a rest station for the tooling which has been preset on the BFA prior to utilization at the flexible grinding cell 20. A communication link 68 is provided from the BFA to the computer 46 to input the size of the workpiece 64 being measured at the BFA. The computer 46 includes appropriate software to properly interface and coordinate the operation of the flexible grinding cell 20 with the operation of the robot 48 and in-processes gages, for example like the in-process gage 38 which has been preset by the BFA.

Figure 2:
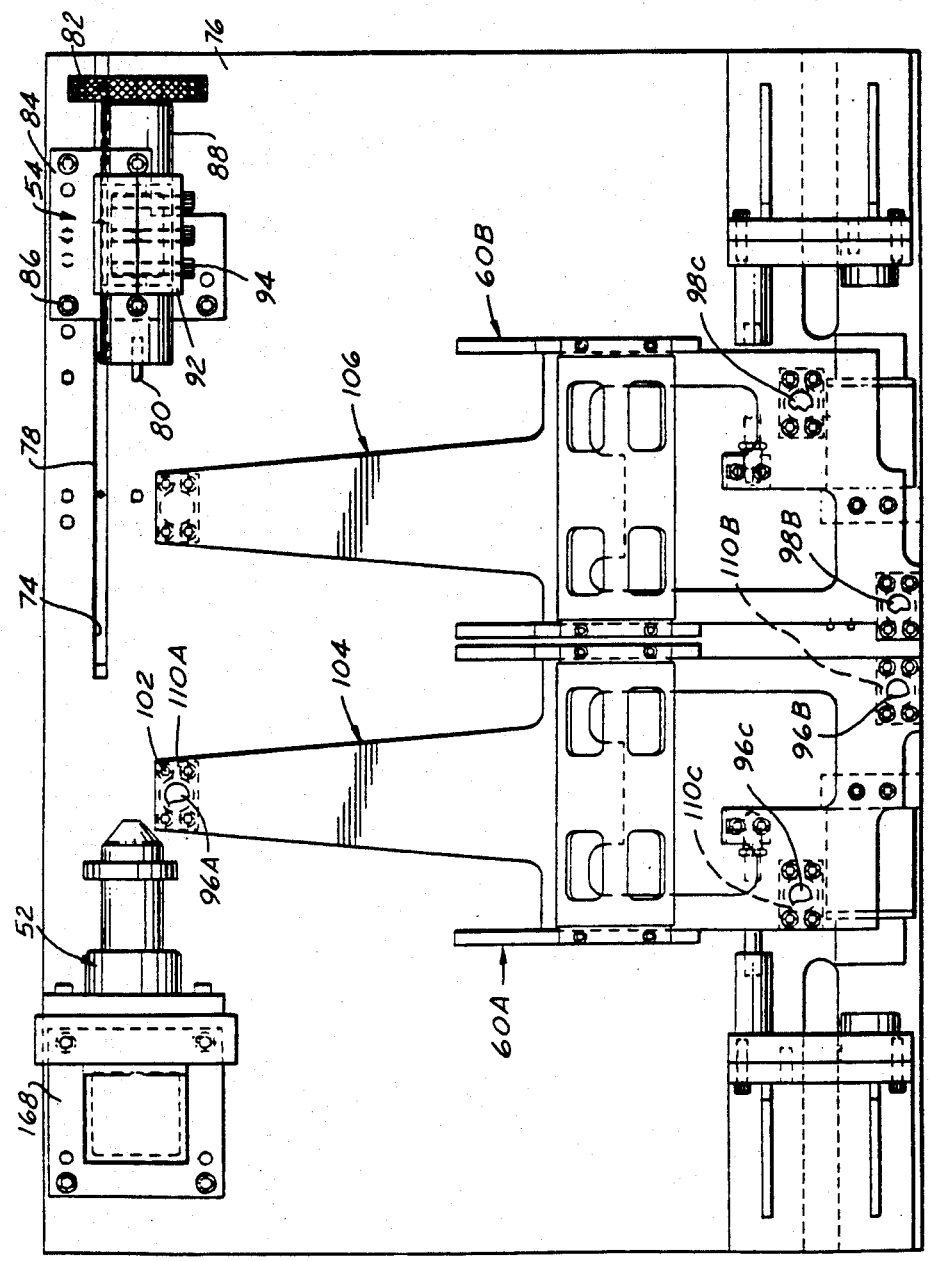
FIG. 2 is a top elevational view of a bench fixture having a gage pallet thereon.
Figure 3:
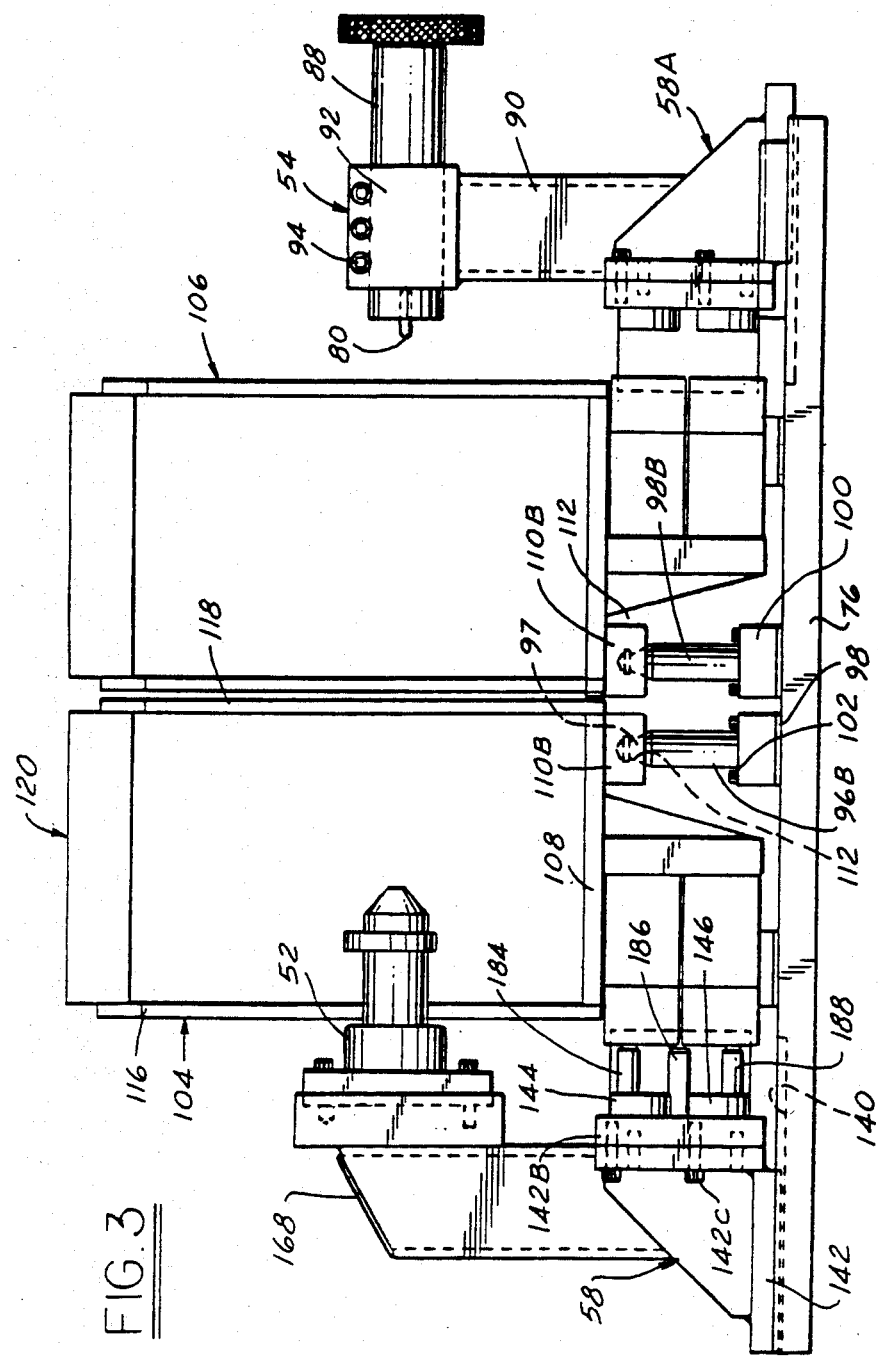
FIG. 3 is a front elevation of the bench fixture assembly and gage pallet of FIG. 2.
Figure 4:
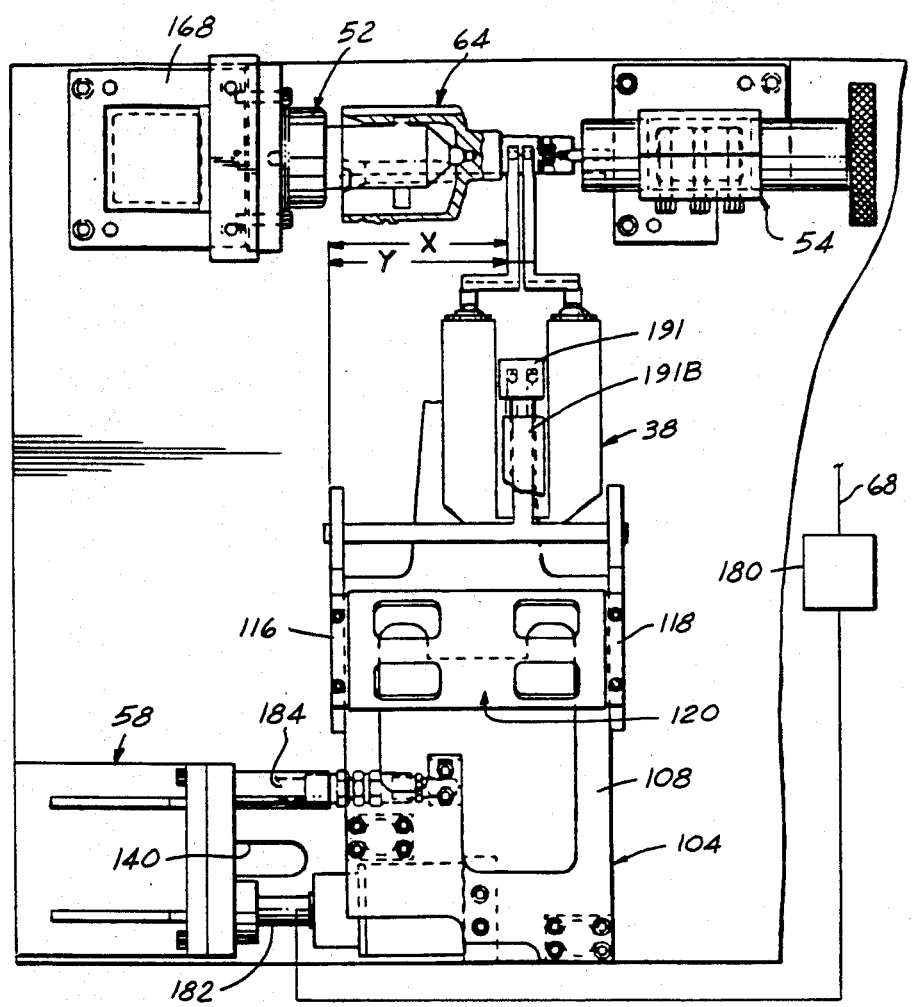
FIG. 4 is a top elevational view of the bench fixture assembly and gage pallet in association with an in-process gage.

Referring now to FIGS. 2 through 4, the BFA 50 is illustrated as including a keyway 74 on the base 76 along a line parallel to the centers defined by the work drive 52 and the tail stock 54. The tail stock is carried by a key 78 so as to be adjustably positioned with respect to the work drive 52. The tail stock includes an adjustable center 80 that is adjustably positioned by a rotatable positioning knob 82. A clamp plate 84 is fastened by screws 86 to locate the tail stock 54 on the machine base 76 axially with respect to the work drive 52.

The body 88 of the tail stock 54 is connected to an upright mast 90 by a clamp 92 secured in place by screws 94.

In the illustrated arrangement two gage pallet assemblies 60A and 60B are illustrated. In the arrangement the pallet positioner 56 in the diagrammatic showing in FIG. 1 is represented by two series of precision studs 96A,96B,96C; and 98A,98B,98C. Each of the aforesaid precision studs 96,98 include a base shim 98 and a stud locator 100 that is held to the base 76 by a plurality of screws 102.

Each set of the precision studs defines a three point support system for a gage pallet assembly. In the BFA 50 of FIG. 2 the gage pallet assembly 104 is a left-hand unit carried on studs 96A–96C. A right-hand gage pallet assembly 106 is located on the base 76 to one side of the gage pallet assembly 104 where it is supported by the precision studs 98A through 98C.

Each of the gage pallet assemblies 104,106 include a base plate 108. The base plate 108 includes spaced stud receptacles or sockets 110A, 110B, 110C that are adapted to receive the upstanding precision studs 96A through 96C and 98A through 98C to accurately locate the gage pallet assemblies 104,106 on the base 76. Each of the stud receptacles 110A through 110C includes a conical seat 112 that is adapted to receive and be positioned by the tapered end 97 provided on each of the precision studs 96,98.

The base plate 108 carries a vertical frame 114 including side members 116,118 joined by a hollow cross frame 120. The cross frame is secured by side clamps 122 and 124 and associated screws 126 to the upper end of each of the side members 116,118 to form a rigid support for an in-process gage such as gage 38 shown in FIG. 9.

Figure 9:
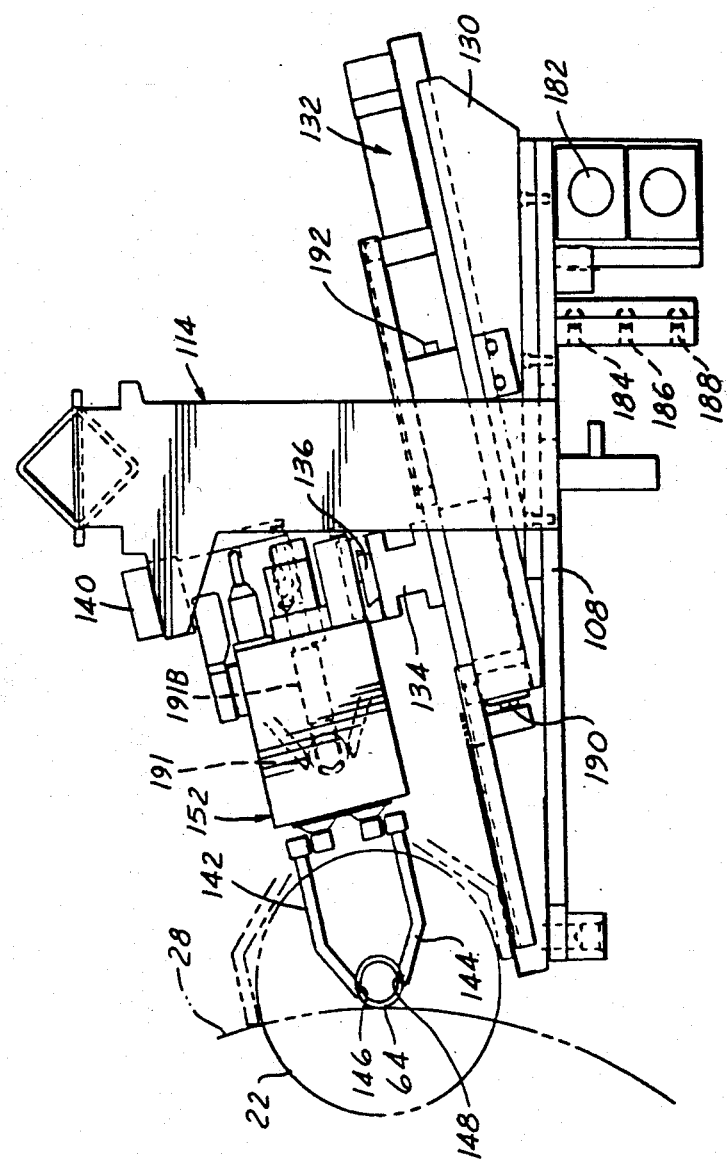
FIG. 9 is a side elevational view showing the gage pallet of FIG. 8 and further including the mounted in-process gage assembly positioned with respect to the workpiece on the grinding machine.
Figure 10:
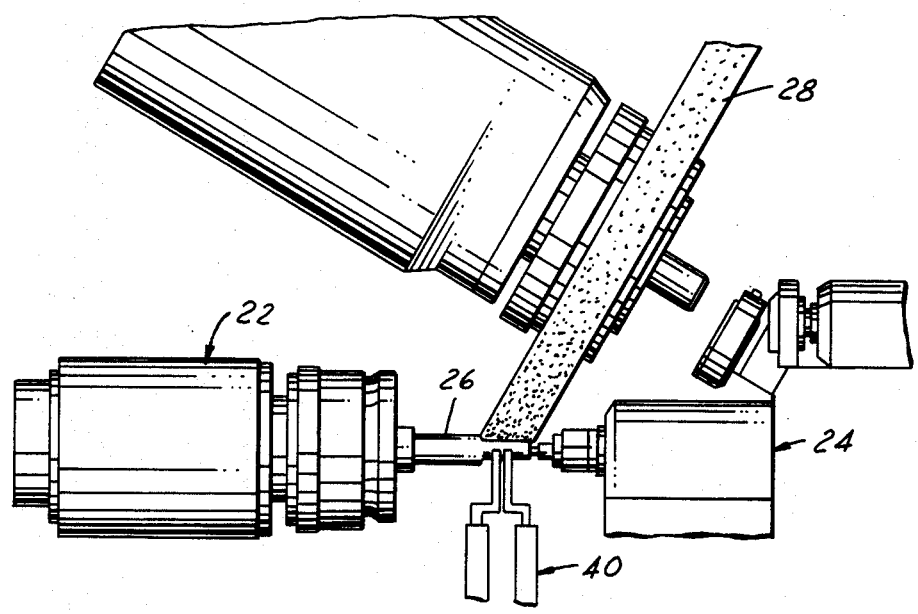
FIG. 10 is a top elevational view of the machine and in-process assembly shown in FIG. 9.

The in-process gage is controlled by a Marposs Model E39 amplified. The in-process gage is shown in FIG. 9. It is supported by a wedge plate 130 at a predetermined angular disposition with respect to the base plate 108. It includes a hydraulic drive cylinder 132 operative to position a cross plate 134 of the gage 38 toward and away from a workpiece 64. The gage 38 further includes a cross slide 136 that includes dovetail slide ways that are manually positioned to the desired position between the work drive 52 and the tail stock 54 of the BFA. The feelers 140 include fingers 142,144 thereon with tips 146,148 respectively that engage the outside diameter of a master workpiece 64 so as to produce a predetermined gage signal from the gage amplifier 150 of the in-process gage 38.

The fully retracted position of the gage 138 is shown in dotted lines at reference numeral 152 in FIG. 9 at which point the setting area of the BFA is cleared for location of a master workpiece 64 therein. And, additionally, when on the grinding cell the area is cleared for unloading and loading a new workpiece.

The coupling locator 58 (FIG. 3) on the base 76 includes a coupling slideway 140 in which a coupling slide 142 is disposed. The coupling locator plate 142C is adjusted to be compatible with set-up gage 156,158 as described on page 17. Coupling locators 58,58b are then utilized as a master to adjust fluid and electrical connections on respective gage pallets 104,106 to be alike and interchangeable. More particularly the coupling slide includes a plate carrying plugs representing electrical receptacles 144,146 on one side thereof and pins representing hydraulic fittings 148,150,152 on the opposite side thereof. Gage pallet assemblies 104,106 with their respective arrays of hydraulic fittings 184,186,188 and electrical fittings 182 must be adjusted to appear identical when placed in flexible grinding cell 20. This is accomplished by means of coupling locator 58,58b after it has been mastered by the set-up gage 156,158.

Figure 5:
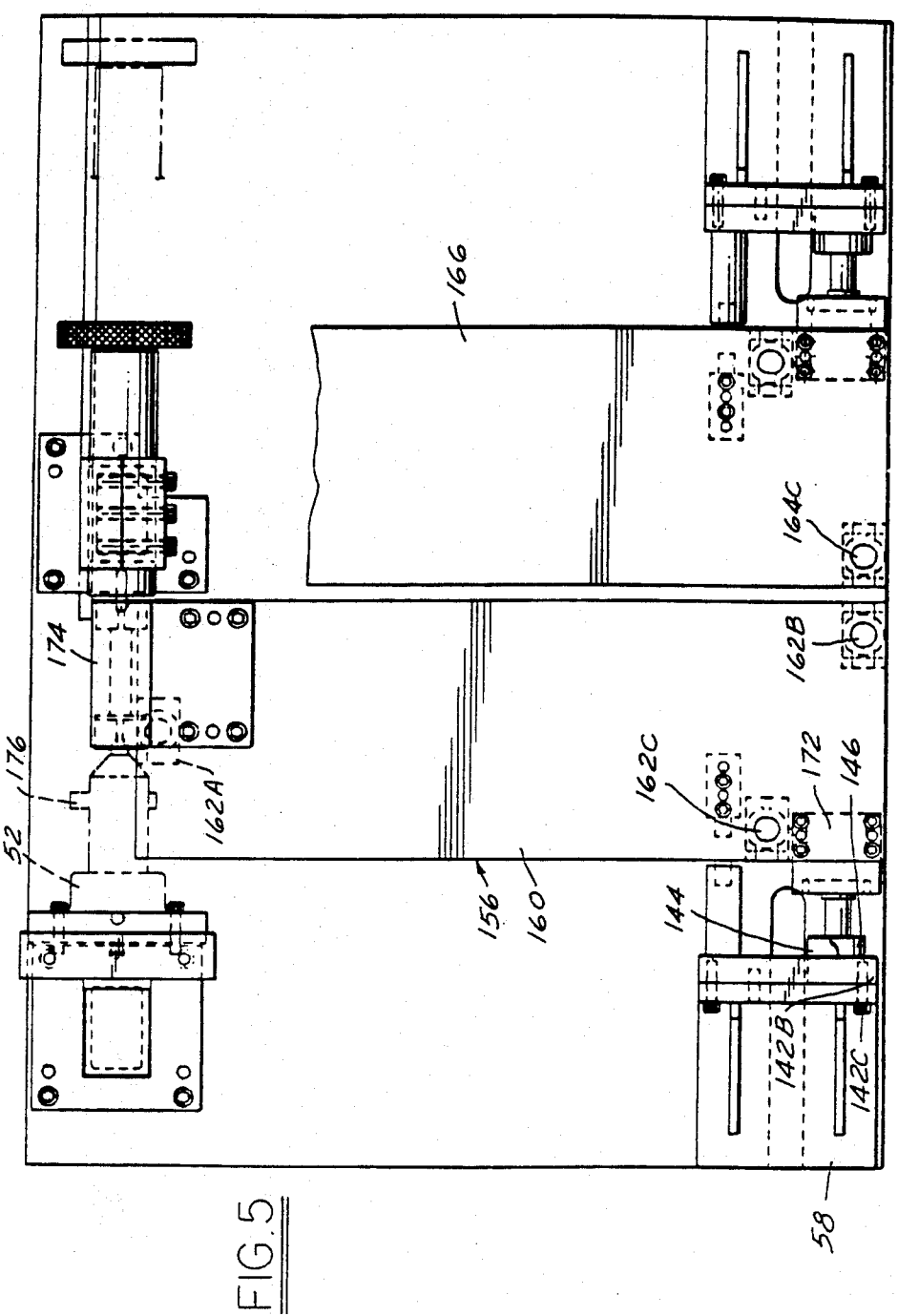
FIG. 5 is a top elevational view of a bench fixture assembly with a setup gage supported thereon.
Figure 8:
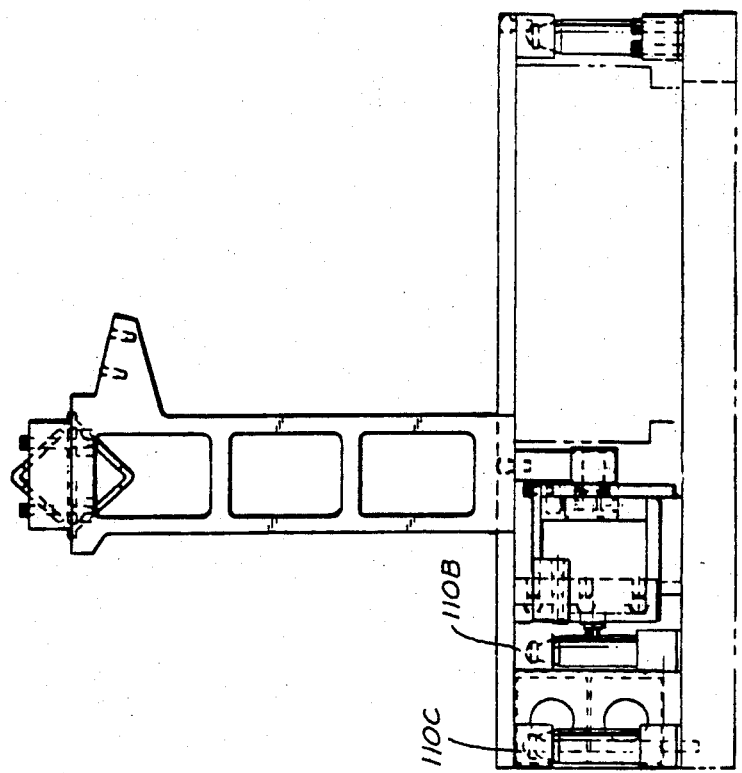
FIG. 8 is a side elevational view of the pallet shown in FIG. 7.
Figure 7:
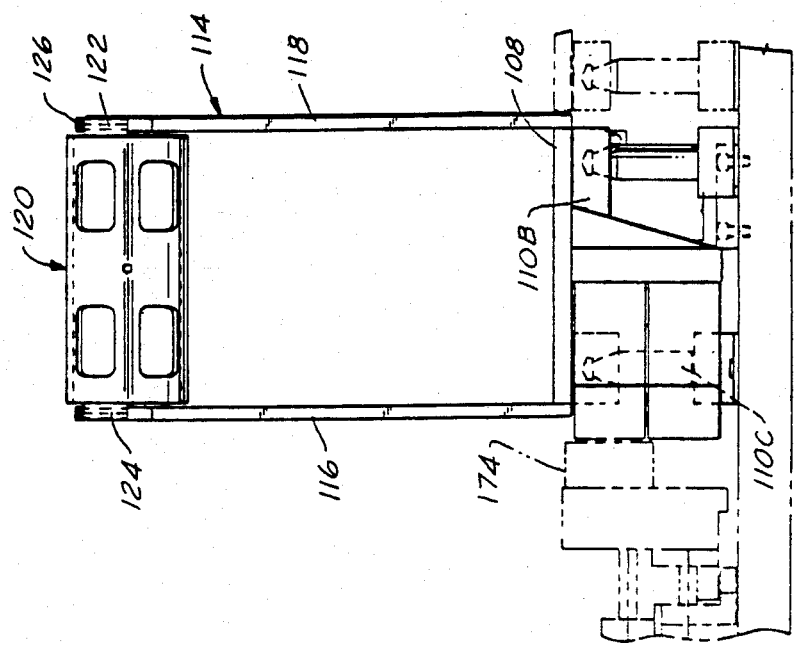
FIG. 7 is a front elevational view of gage pallet mounted on a grinding machine base.

FIGS. 5 and 6 show the BFA associated with a left-hand setup gage 156 and a right-hand setup gage 158. Each of the setup gage 156 includes a base plate 160 having a plurality of precision stud receiving receptacles or sockets 162A,162B, 162C that are supporting received by the previously described precision studs on the base 76 for purposes to be discussed. Likewise precision stud receptacles 164A,164B,164C are provided on a base portion 166 of the setup gage 158 to serve the same purpose.

Each of the setup gages 156,158 include a reference hydraulic coupling array 170 and a reference electrical receptacle 172. Additionally each of the setup gages includes a spacer plate 174 to be interposed between the centers of the work drive and the tail stock of the BFA 50 for reasons to be discussed.

The setup procedure for the BFA 50 includes placing the work driver 52 in a head stock bracket 168. Then the setup gage 156 is located between the centers of the work driver 52 and the tail stock center 80.

The precision studs are set for full engagement in the respective receptacle/sockets on the bottom of the setup gage fixtures 156 or 158. Thereafter the shims 98 are ground to maintain the underside of the base or platform 160,166 parallel with the surface of the base 76 within closely held tolerances.

At this point the precision studs 96,98 are doweled in place.

Then, the coupling slide 58 attached with mounting screws 142c loosely to the coupling locator plate 142b with attached pins 144,146,148,150,152 thereon are moved toward the setup gages 156,158. The pins of the coupling locator plate thereon are engaged in the respective locating holes defined by the mock hydraulic and electrical receptacles 170,172 on the setup gages 156,158. The coupling locator mounting screws 142c are tightened and the coupling locator is positioned with respect to the hydraulic and electric receptacles 170,172 on the setup gage 156,158. Finally, the setup gage is removed from between the centers at the gaging station. At this point the BFA 50 has been set to receive the in-process gaging assemblies previously described.

The procedure for setting the grinding machine cell 20 is to place a work driver in the diaphragm chuck 22 on the machine spindle 23. The setup gages 156,158 are then moved by the robot to the cell and the same steps which locate the precision studs on the BFA 50 are carried out on the base of the grinding machine cell 20. The pallet coupling slides 174,176 on the cell are then adjusted and the shims are machined so that the receptacles of the pallet coupling slides properly engage the mating pin or locating holes on the setup gage. Thereafter the pallet coupling slides are secured in the proper location and the setup gage is removed from the cell centers with precision studs and coupling slides thereon properly positioned for subsequent use of preset in-process gaging equipment.

The setup procedure for mounting an in-process pallet gage on the BFA 50 includes placing the pallet and gage assembly 104 and pilot and gage assembly 106 onto either the left-hand or right-hand position of the BFA 50 by use of a suitable overhead lifting device. The head stock center and driver which is to be set into the BFA 50 is secured in place. Thereafter the master part 64 is inserted between the head stock and tail stock centers.

The Marposs gage amplifier 180 is connected by an electrical connector 182 into the gage pallet assembly being tested, for example a left-hand gage pallet assembly 104. Hydraulic quick disconnect fittings 184,186,188 are plugged into the gage head assembly 38 of the left-hand assembly 104.

Then the gage head 38 and the fingers 142,144 thereon are positioned to desired X and Y dimensions shown on a schedule for a respective part that is being set up on the BFA 50.

Once the fingers 142,144 are adjusted to a desired clearance position, the fingers are retracted to an open position and the gage slide for the hydraulic cylinder 132 is moved toward the master workpiece 64 until the positioning slide is moved to the forward stop position 190 on the gage slide. At this point the gage fingers 142,144 are released and adjusted onto the part to obtain a zero output from the gage head in accordance with the normal operation of the aforedescribed Marposs gage. The gage fingers 142,144 are then retracted and the gage slide is moved to the rear away from the master workpiece 64 and toward the Marposs pallet master into engagement with the rear stop 192 of the gage slide. The fingers 142,144 are then released into the pallet master 191. The pallet master is mounted to pallet master bracket 191b which is adjusted left and right manually on bracket 140 which is attached to vertical frame 114. The pallet master 191 is adjusted so that the amplifier also reads zero when the gage slide is retracted.

Once the gage fingers are properly setup and the gage slide is retracted against the rear stop 192 all the hydraulic lines and the electrical lines are disconnected from the gage head. The gage head and gage pallet assembly is thus ready to be placed into a tooling pallet in the rack 72 for subsequent transfer to the grinding machine cell 20.

Once the preset gage pallet assembly 104 and gage 38 are preset the computer 46 receives a suitable input signal that the gage can be used in a subsequent machine cell in-process gaging operation. When the tool setup for the flexible grinding cell 20 is in place and the computer signals for transfer of a preset gage and pallet assembly, the robot and/or AGV 70 are operated so that the in-process gaging apparatus will be transferred to the cell 20 for gaging a master workpiece size which the computer has selected for a desired job setup. A previously used gage pallet is removed from the cell 20 and the robot then installs the gage pallet needed for the workpiece type which is to be ground in the next operation on the cell. The robot signals in the computer 46 that the transfer of the select gage pallet has been accomplished and it is clamped on the macine by suitable means. Pallet coupling mechanisms 174,176 on the machine connect all the necessary service lines to provide the gage pallet assembly and the gage head 38 thereon with fluid and electrical power and signal connections. The robot then places an appropriate master workpiece accompanying the gage pallet assembly in the grinding cell 20 at the spindle and chuck and tail stock thereon and then signals the computer that the machine can be conditioned to hold the master workpiece in place, for example by means of the chucks and/or centers which may themselves have been exchanged by the rotor during the tooling setup of a subsequent machining operation for the cell 20.

The computer 46 then signals the machine to actuate the in-process gage to measure the master workpiece. If the measurement is not already equal to the known size of the master workpiece an electrical offset signal is introduced by the gage control amplifier to cause the measurement to equal the known size of the master workpiece thereby correcting for any positioning errors introduced when the selected pallet assembly is supported on the precision studs of the grinding cell 20. At this point the machine is conditioned for automatically grinding the new workpiece types with in-process gaging provided by the error compensated gage head 38.

We claim:

1. A process for gaging a workpiece in a flexible grinding cell comprising the steps of presetting a gage and pallet assembly on a bench fixture assembly to a predetermined master workpiece; transferring the gage pallet assembly to a premachining location; thereafter removing the previously used in-process gage pallet assembly from a flexible grinding cell and replacing it with the bench fixture preset gage pallet assembly; accompanying the selected gage pallet assembly with a master workpiece and assembling it into the grinding cell and thereafter utilizing the selected preset in-process gaging assembly to measure the master workpiece on the cell to determine an error signal; adjusting the gage amplifier in accordance with the error signal to compensate for mounting errors of the gage assembly on the flexible grinding cell and thereafter utilizing the in-process selected gaging equipment to gage the grinding of a second preselected part in the grinding operation on the flexible grinding cell.

2. In the combination of claim 1, providing a presettable gage assembly having a platform with a plurality of support features thereon coacting with complimentary support features on the bench fixture assembly and the flexible grinding cell to locate the platform of the presettable gage and gage pallet assembly with respect to the bench fixture and with respect to the flexible grinding cell when the pallet assembly is respectively placed thereon.

3. A computer numerically control changeover apparatus of in-process gaging equipment for flexible grinding cells of the type controlled by a CNC controller and having a spindle with a chuck thereon for supporting a workpiece with respect to a tail stock comprising a bench fixture which is a replica of the grinding cell including a work driver and tail stock corresponding to those on the flexible grinding cell; a master workpiece removably supported on said work driver of the bench fixture and transferable to the spindle chuck of the grinding cell along with tooling for a subsequent computer controlled grinding operation; pallet mounted in-process gage means having support features thereon; identicl coacting support features on said bench setup fixture and said grinding cell to receive said pallet mounted in process gage means for positioning feelers thereon with respect to the master workpiece in the bench setup fixture so as to preset the gage for subsequent use in the cell; means for receiving the preset gage on the pallet for subsequent transfer to the support features on the grinding cell means; and means for automatically transferring the preset pallet mounted in-process gage from the bench setup fixture to the cell in accordance with flexible manufacturing operations conducted at the grinding cell.

4. In the combination of claim 3, said bench set up fixtures and said grinding cell each including connector means for supplying fluid and electrical power to the gage head on said pallet assembly means; and means for directing a gage signal from the bench setup fixture to the CNC controller to indicate the preconditioning of a pallet mounted in-process gage on the fixture for use in a subsequent machining operation on the grinding cell and means for controlling the machine control in accordance with a flexible part manufacturing schedule to condition the grinding cell for receiving the pallet means and the preset gage into an operative relationship with the part to be machined in the grinding cell.

5. In the combination of claim 4, means including a robot for transferring said preset pallet and gage assembly from the bench setup fixture to the machining cell; and means for causing the operation of the robot to signal the computer that the preset pallet and gage head have been placed on the machine for subsequent clamping thereon; said robot being operative to place an appropriate master workpiece in the machining cell for compensating for error introduced by the installation of the pallet in the grinding cell.

* * * * *